United States Patent

Beruck

[15] 3,635,086

[45] Jan. 18, 1972

[54] TEMPERATURE MEASURING AND INDICATING DEVICE

[72] Inventor: Andrew J. Beruck, 615 Pear St., Dover, Del. 19901

[22] Filed: Nov. 13, 1969

[21] Appl. No.: 876,473

[52] U.S. Cl. ..........................................................73/343 R
[51] Int. Cl. .......................................................G01k 1/14
[58] Field of Search .......................73/343, 347, 349; 259/4; 236/12, 13; 137/602, 603, 604

[56] References Cited

UNITED STATES PATENTS

| 1,397,720 | 11/1921 | Campbell | 73/343 |
| 2,252,076 | 8/1941 | Juterbock | 259/4 |
| 2,289,908 | 7/1942 | Gorton | 73/349 |
| 3,100,391 | 8/1963 | Mansfield | 73/348 |

Primary Examiner—Louis R. Prince
Assistant Examiner—Denis E. Corr
Attorney—Connolly and Hutz

[57] ABSTRACT

Device for measuring and indicating temperature of liquid stream comprises thin-walled nonconductive case with inlet and outlet openings at opposite ends of case. Temperature-sensing unit inside case is immediately adjacent outlet opening thereof. Line connects sensing unit to temperature scale and indicating pointer assembly on exterior of case. Imperforate baffle plate inside case immediately adjacent inlet opening thereof disperses and mixes incoming liquid.

3 Claims, 3 Drawing Figures

PATENTED JAN 18 1972

3,635,086

TEMPERATURE MEASURING AND INDICATING DEVICE

BACKGROUND OF THE INVENTION

The present invention relates to a temperature measuring and indicating device, and more particularly to a device for measuring and indicating the temperature of a liquid stream.

Prior to the present invention numerous arrangements have been proposed for providing stream temperature readings. For one reason or another many of the heretofore available or proposed arrangements have failed to provide accurate readings. Additionally, many stream temperature indicators lack sufficient versatility, such as the devices disclosed in Gorton U.S. Pat No. 2,289,908, granted July 14, 1942, and Harman U.S. Pat. No. 2,626,524, granted Jan. 27, 1953. It is difficult if not impossible to adapt these devices for use as in line temperature sensors.

Accordingly, it is an object of the present invention to provide a device for accurately measuring and indicating the temperature of a liquid stream, the device being easy to manufacture and assemble.

Another object of the present invention is to provide a device for accurately measuring and indicating the temperature of a liquid stream which device is versatile to the extent that it may be used as an in-line temperature sensor or simply to measure the discharge temperature of a liquid stream.

SUMMARY OF THE INVENTION

In accordance with the present invention, a device for measuring and indicating the temperature of a liquid stream comprises a thin-walled nonconductive case with inlet and outlet openings at opposite ends of the case. A temperature-sensing unit is provided inside the case immediately adjacent the outlet opening thereof. A line connects the sensing unit to a temperature scale and indicating pointer assembly on the exterior of the case. An imperforate baffle plate inside the case immediately adjacent the inlet opening thereof is constructed and arranged to disperse and mix the incoming liquid so that the liquid in contact with the sensing unit has a uniform temperature throughout.

The inlet opening of the case preferably is slightly larger in cross section than the outlet opening. With such an arrangement the case is always filled with liquid during flow conditions. Additionally, a female connector is provided at the inlet opening of the case for attaching the device to a spigot or tap, for example. A male connector at the outlet opening facilitates connection of a hose or similar conduit to the case. With a conduit attached to the male connector the device functions as an in-line temperature sensor.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
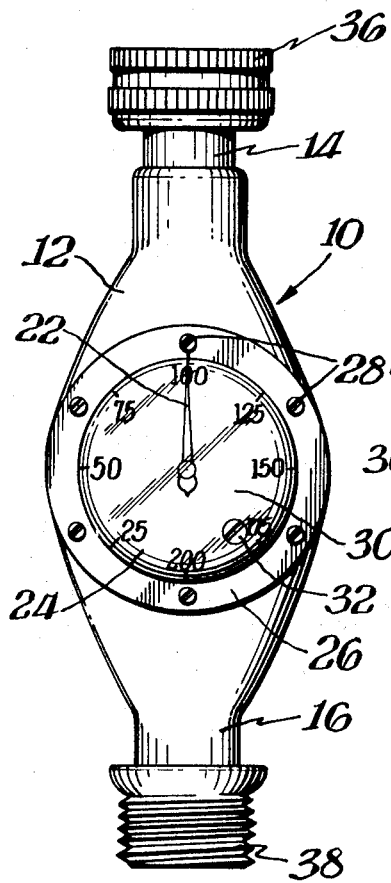
FIG. 1 is a front elevational view of a temperature measuring and indicating device according to the present invention.
Figure 2:
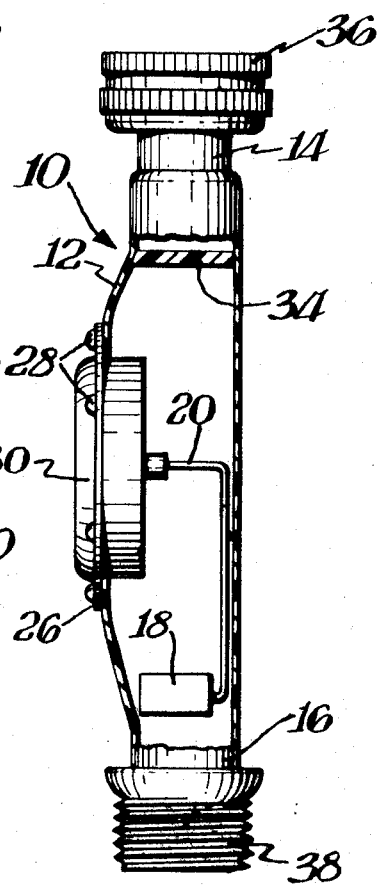
FIG. 2 is a side elevational view of the device shown in FIG. 1 with portions thereof broken away to show interior details.
Figure 3:
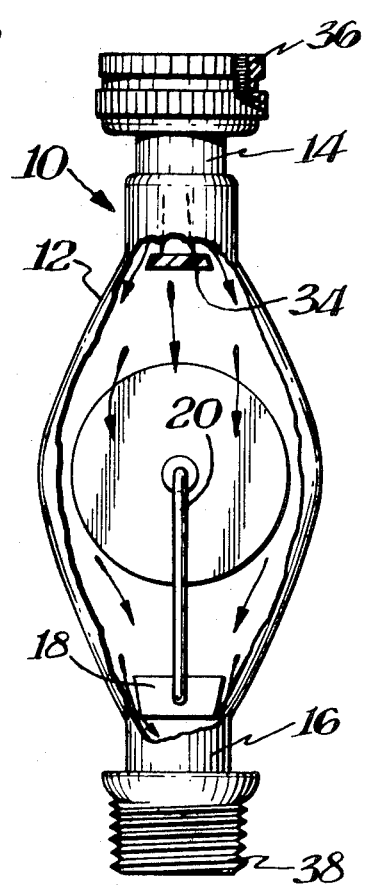
FIG. 3 is a rear elevational view of the device shown in FIGS. 1 and 2 with portions broken away to show detail.

Referring in more particularity to the drawing, FIG. 1 illustrates a device 10 for measuring and indicating the temperature of a liquid stream, such as tapwater, for example. The device 10 comprises a thin-walled nonconductive case 12 having an inlet opening 14 at one end thereof and an outlet opening 16 at its other end. The case is preferably thin walled and fabricated from nonconductive material, such as thermoplastics, for example. Fabrication of the case in this manner provides highly accurate temperature readings since the temperature of the liquid flowing through the case is not affected by the case material.

A temperature-sensing unit 18 is provided inside the case 12 immediately adjacent the outlet opening 16. The sensor may be of the Bourdon type comprising a bulb filled with either gas, such as nitrogen, or liquid, such as alcohol. The bulb 18 is connected by a capillary 20 to an indicating pointer 22 on the exterior of the case 12. The expansion and contraction of the liquid or gas in the sensor bulb 18 in response to temperature changes of the liquid surrounding the bulb activates a Bourdon spring (not shown) which moves the indicating pointer 22, as is well known in the art.

As shown best in FIG. 1, the indicating pointer 22 is associated with a stationary temperature scale 24 located on the exterior of the device 10. The scale 24 is fixed to the exterior of the case 12 by a flange 26 and fasteners 28. A rubber gasket may be provided between the flange and the case for sealing purposes. A glass dial 30 covers the temperature scale. A setscrew 32 is provided for adjusting or otherwise calibrating the location of the indicating pointer 22 with temperature scale 24.

An imperforate baffle plate 34 is located inside the case 12 immediately adjacent the inlet opening 14. The baffle plate is secured to the interior of the case along two of its four sides. The plate functions to disperse and mix incoming liquid so that an accurate and representative temperature reading is obtained when the liquid mixture reaches and surrounds the temperature-sensing bulb 18.

The inlet opening 14 of the case 12 is slightly larger in cross section than the outlet opening 16. For example, both the inlet and outlet opening may be circular in cross section with the inlet having a five-eighth inch diameter opening and the outlet having a one-half inch diameter opening.

This arrangement provides a slightly higher inlet rate which causes the case to become filled with liquid under flow conditions. With the case completely filled with liquid highly accurate temperature readings are obtained.

An internally threaded female connector 36 may be provided at the inlet opening 14 for connecting the temperature measuring and sensing device 10 to an externally threaded faucet or spigot, for example. Also, an externally threaded male connector 38 is provided at the outlet opening 16 to facilitate connection of the device 10 to a hose or similar conduit. This versatility enables the device to function as an in-line temperature sensor or in the case when a conduit is not fastened to the male connector 38 the device measures the discharge temperature of the liquid stream.

The operation of the device 10 is quite simple. First, the internally threaded female connector 36 at the inlet 14 is attached to a water supply line. AFter the water flows through the case 12 for about a minute or so accurate temperature readings may be instantaneously obtained, the liquid being thoroughly mixed before it surrounds the bulb 18.

What is claimed is:

1. A device for measuring and indicating the temperature of a liquid stream comprising a thin-walled nonconductive case with inlet and outlet openings at opposite ends of the case a temperature-sensing unit inside the case immediately adjacent the outlet opening thereof, means connecting the sensing unit to a temperature scale and indicating pointer assembly positioned on the exterior of the case, and an imperforate baffle plate inside the case immediately adjacent the inlet opening thereof constructed and arranged to disperse and mix the incoming liquid as it flows through the case, and wherein the inlet opening of the case is slightly larger in cross section than the outlet opening thereof whereby the case fills with liquid when the liquid flows through the case.

2. A device for measuring and indicating the temperature of a liquid stream as in claim 1 including an internally threaded female connector at the inlet opening of the case and an externally threaded male connector at the outlet opening thereof.

3. A device for measuring and indicating the temperature of a liquid stream as in claim 1 wherein the imperforate baffle plate is secured to the inside of the case and stationary.

* * * * *